July 23, 1957 E. RONDTHALER ET AL 2,800,062
PHOTOGRAPHIC TEXT COMPOSITION AND APPARATUS THEREFOR
Filed Nov. 8, 1954 2 Sheets-Sheet 1
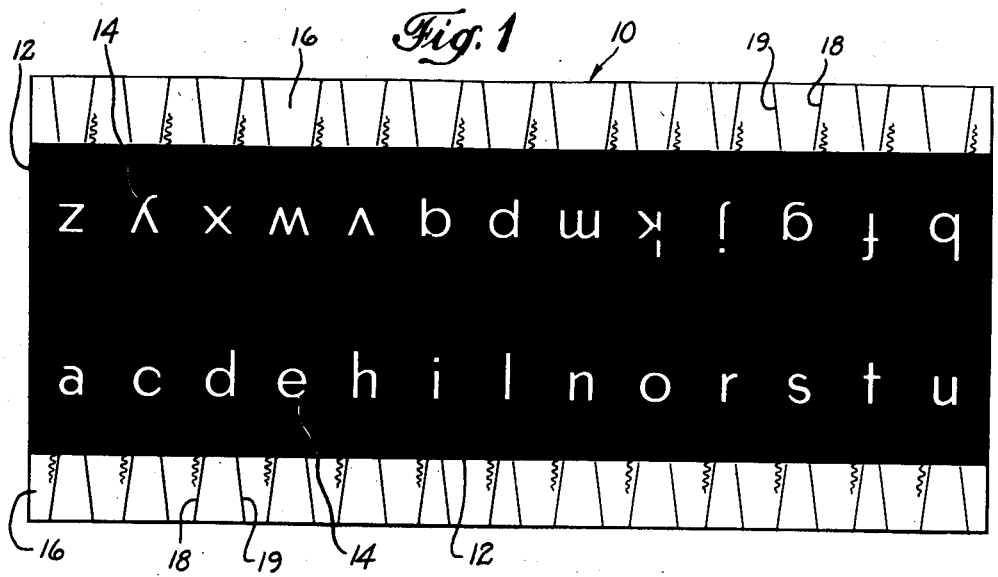
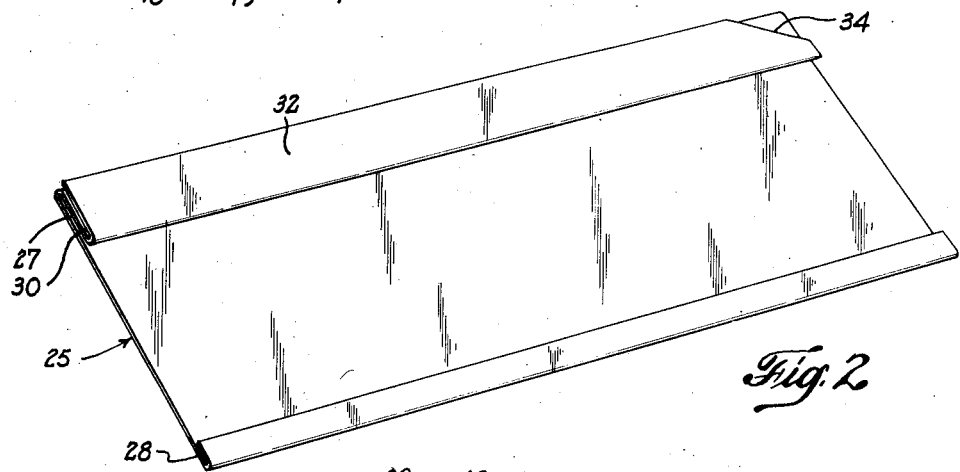
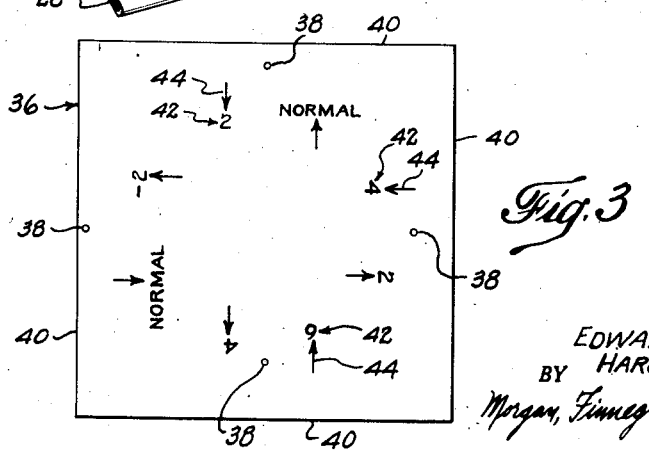
INVENTORS
EDWARD RONDTHALER
BY HAROLD HORMAN
Morgan, Finnegan, Durham & Pine
ATTORNEYS

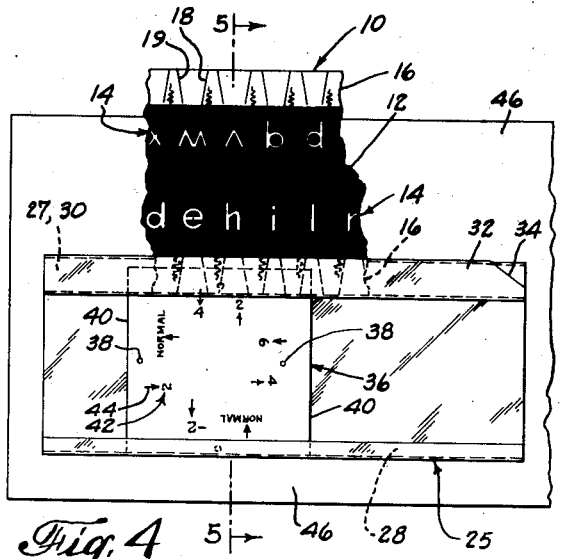
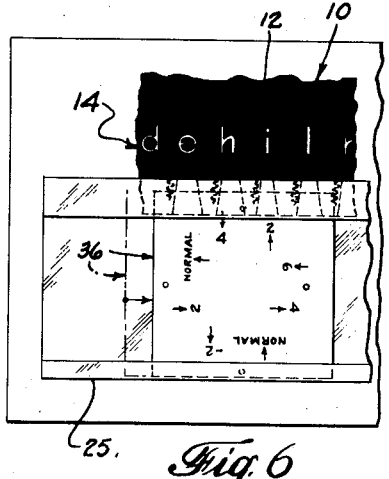
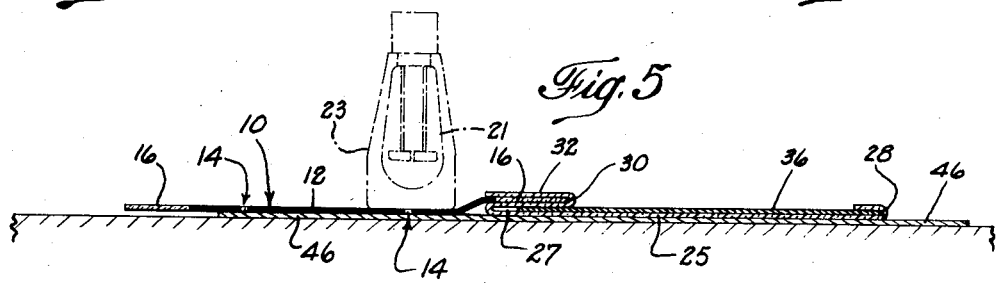
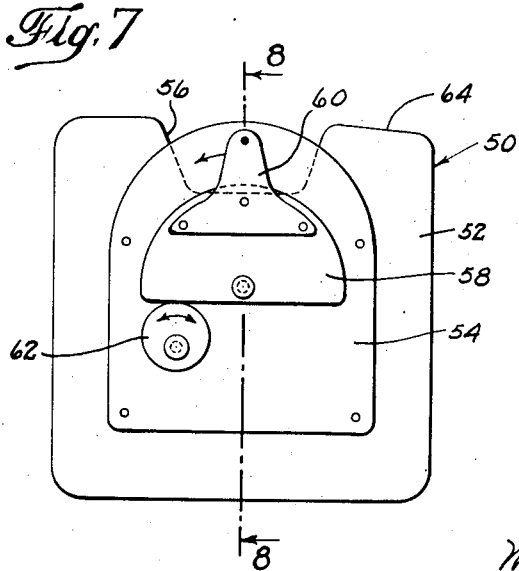
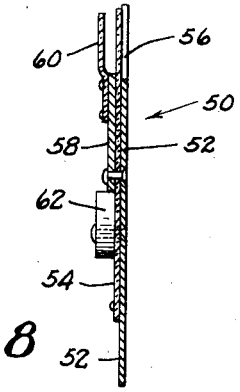
INVENTORS
EDWARD RONDTHALER
HAROLD HORMAN

United States Patent Office 2,800,062
Patented July 23, 1957

2,800,062

PHOTOGRAPHIC TEXT COMPOSITION AND APPARATUS THEREFOR

Edward Rondthaler, Croton-on-Hudson, and Harold Horman, North Tarrytown, N. Y.

Application November 8, 1954, Serial No. 467,372

15 Claims. (Cl. 95—4.5)

The invention relates to a method of photographically composing ornamental and textual matter on photosensitive material and to apparatus by which the method may be advantageously carried out.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for its object the provision of a method of photographically composing ornamental and textual matter which will be simple and fast and one which may be quickly mastered by experienced and inexperienced operators alike.

Another object of the invention is the provision of apparatus which, in conjunction with a phototypographical stencil, will facilitate composition of a line of ornamental or textual matter. Another object of the invention is to provide apparatus which will enable inexperienced operators to properly compose a line of ornamental or textual matter simply, quickly and accurately. It is also an object of the invention to provide such composing apparatus which is simple in construction and which may be manufactured easily and at low cost but which occupies little space and insures proper spacing between the letters or designs in the composition. A further object of the invention is to provide composing apparatus which will permit a wide degree of latitude in the amount of spacing between the letters or designs and one which will readily indicate the amount of spacing being provided.

Briefly the applicants' method comprises the steps of placing over a photosensitive sheet a freely-moving letter or design bearing phototypographical stencil formed as a negative on a sheet of transparent base material provided with opaque portions serving to define a series of transparent letter portions. The stencil is provided with series of left and right reference indicia associated with each letter. After the stencil has been moved to properly position the first letter of the text, an index member bearing cooperating reference indicia is moved into position with respect to an index of one series of reference indicia of the first letter. A lamp is then placed over the letter and the letter exposed onto the photosensitive paper. Thereafter the stencil is laterally moved to bring an index of another series of reference indicia of the second letter into the same position as the index of the first series of reference indicia for the first letter occupied relative to the index member. This letter is then exposed onto the photosensitive sheet. The index member is moved laterally until it registers with an index of the first series of reference indicia for the second letter. After this the stencil is moved to bring an index of the second series of reference indicia for the third letter into register with the index member and the process repeated until the entire text has been composed. The amount of spacing between letters is determined by the reference indicia on the stencil and on the index member and is varied according to the point of intersection of the two reference indicia. Therefore, during the positioning of the stencil and the index member the reference indicia on the index member are selectively moved relative to the reference indicia on the stencil to vary the point of intersection and the spacing between letters.

The applicants' apparatus generally comprises two principal parts; a movable index member having reference indicia thereon adapted to cooperate with reference indicia on the stencil and a guide member for the index member having at least one guide surface for the index member and another guide surface for the stencil, the second mentioned guiding surface being parallel to the first. The guide member is preferably constructed from a transparent material and has its longitudinal edges folded inwardly to form a pair of inwardly-opening parallel slots at each edge of the member to receive the movable index member. One of the folds is again folded back on itself to form an outwardly-opening slot parallel to the others to receive the phototypographical stencil. In one form of the invention the index member is substantially rectangular and preferably square and is provided with reference indicia adjacent each edge but variously spaced therefrom and adapted to cooperate with sloping indicia lines on the stencil to selectively vary the spacing between different letters. Further variation in the spacing between letters is achieved by making the width of the index member between the parallel guiding slots less than the distance between the slots so that the index member can engage either of two guiding surfaces and vary the interaction of the indicia on the index member and the stencil.

The index member may also be constructed of a substantially rectangular base member having a pivoted reference indicia mounted thereon whereby instead of removing the index member and turning to another side the reference indicia may be pivoted toward or away from the edge of the base member. Additional variation in the spacing may be obtained by providing a tapered surface along one edge of the index member which will permit the index member to be cocked diagonally between the parallel guide surfaces to vary the position of the reference indicia on the member.

It will be understood that the foregoing general description and the following detailed description as well are exemplary and explanatory of the invention but are not restrictive thereof.

Of the drawings:

Fig. 1 is a plan view of an illustrative type of stencil with which the registering device may be advantageously used said stencil being a phototypographic alphabetical stencil formed as a negative on a sheet of transparent base material having transparent letter portions formed within the opaque portions.

Fig. 2 is a perspective view of one form of a guide member,

Fig. 3 is a plan view of one form of index member in which the member is substantially square and reference indicia are selectively spaced from each side, Fig. 4 is a plan view, partially in section, illustrating the manner of cooperation between the registering device and the stencil, Fig. 5 is a transverse section taken along the line 5—5 in Fig. 4 looking in the direction of the arrows, with the relative thickness of the various members being exaggerated in order to facilitate illustration, Fig. 6 is a plan view similar to that of Fig. 4 showing a subsequent step in the operation of the registering device, Fig. 7 is a plan view of a modified form of index member in which the reference indicia is pivoted to the base member, and Fig. 8 is a transverse section taken along the line 8—8 in Fig. 7 looking in the direction of the arrows.

Referring now in detail to the preferred embodiments of the invention illustrated in the drawings:

The stencil 10 shown for the purpose of illustrating the invention is formed as a negative on a sheet of transparent base material provided with opaque portions 12 which serve to define a series of transparent letter portions 14. The letters on the illustrative stencil are arranged into two sets according to the frequency with which the letters occur in the English language and each set is then arranged alphabetically. It is to be understood, however, that the arrangement of the letters on the stencil is not essential to the operation of the applicants' registering device as it may be used with any letter arrangement. Both longitudinal edge portions 16 of the stencil are transparent and are provided with a series of convergent reference indicia lines 18, 19, each letter having a left and right reference indicia line, the slope of each being opposite to that of the other. The indicia lines, in conjunction with an index member, determine the amount of spacing between successive letters, the amount of spacing increasing as the lines diverge farther apart. The letter images on the stencil are adapted to be transferred to photosensitive paper 46 upon exposure to the light of a lamp 21 (Fig. 5). Such a lamp, with a proper shield or mask 23, is placed over the individual letters in the order in which the letters appear in the textual matter.

The guide member 25 is preferably made from a transparent material and formed in one piece. The longitudinal edge portions of the guide member are folded over to form upper and lower inwardly-opening grooves or slots 27, 28 having guide surfaces at the bottom thereof; the upper groove preferably being deeper than the lower and slightly wider than the width of the transparent edge portions on the stencil. The upper fold is again folded back upon itself to form another groove 30 having its open end at the outer edge of the guide member. Each of the grooves is formed so that its bottom guide surface is parallel with the bottom guide surface of each of the other grooves and the outer fold 32 for the upper edge portion of the guide member is cut away as at 34 to permit the easy insertion of the stencil within the groove. Sufficient clearance is provided in the grooves to permit the stencil and the index member to be freely slidable therein.

One form of index means is shown in Fig. 3 in which the member 36 is approximately square, the sides of the square preferably being somewhat less than the distance between the bottoms of the guiding grooves on the guide member. Reference indicia in the form of small circles 38 are provided adjacent each edge 40 of the index member, each circle being selectively spaced at a varying distance from an edge of the index member. When the index member is inserted between inwardly-opening guide grooves 27, 28 on the guide member 25 only one edge of the index member will be in contact with a groove at one time, however, the dimensions of the index member are sufficient to insure that the upper edge of the index member will lie between the guiding groove 30 for the stencil and the upper groove 27 on the index member even when the index member is in engagement with the lower guide groove 28 on the guide member.

With the stencil inserted in the outer guide slot the circular reference indicia 38 on the index member will intersect the sloping indicia lines 18, 19 on the stencil 10 in either of two positions according to whether the index member is in engagement with the upper or lower guide grooves 27, 28. When the index member is in engagement with the lower guide groove 28 the circular reference indicia 38 will cross the sloping indicia lines 18, 19 at a point more closely adjacent to the outer edge portion of the stencil 10 than when the index member 36 is in engagement with the upper guide groove 27. Due to the outward divergence of the reference indicia on the stencil a greater amount of spacing will be provided between letters when the index member engages the lower guide groove than will be provided when the index member engages the upper guide groove. Variations in spacing may therefore be obtained by selectively positioning the index member against either the upper or lower guide groove. The amount of the spacing for each position of the index member is indicated by the numerals 42 and arrows 44 which give the amount of spacing for each groove in typesetter's "points."

To operate the device the guide member is first placed on top of the paper or other material 46 upon which the textual matter is to appear. The index member 36 is then inserted within the guide slots 27, 28 on the guide member 25 and the stencil 10 is inserted within the outer guiding slot 30. In Fig. 4 the index member is shown in engagement with the lower guiding groove 28 but it could just as well have been shown in engagement with the upper guiding groove. With the index member properly positioned with respect to the initial position of the textual matter, the index means 36 is held against movement and the stencil 10 is moved to bring the left reference indicia line 18 into intersecting position with the circular reference indicia 38 on the index means. The letter 14 on the stencil 10 is then transferred to the paper by any suitable means. In the instant case an exposure light 21 is then placed over the letter (in this case the letter h) and the photosensitive paper 46 beneath the stencil is exposed. During or after the exposure the index member 36 is moved until the circular reference mark 38 intersects the right reference indicia line 19 of the letter h (Fig. 6) and the index means 36 is then held against movement and the stencil 10 is moved to bring the left reference indicia line 18 of the next letter into intersecting engagement with the circular reference mark 38 on the index member. The second letter is then exposed and the process is repeated until a complete line of textual matter has been composed.

Due to the differences in the geometry of the shapes of the various letters varying amounts of spacing must be provided between different letters in order to obtain a pleasing appearance in the textual matter. For example, letters having straight edges, such as m and l, must have a greater amount of spacing between them than letters having rounded edges such as e or o. In general this wider spacing is provided initially when the reference indicia 18, 19 are placed on the stencil. However, further adjustment is necessary in certain combinations of shapes, such as LT or LA, which require more or less spacing than is feasible to provide in positioning indicia 18, 19. This variation in spacing may be obtained by changing the guiding surface with which the index member is in engagement, that is, by placing the index member in engagement with the upper guiding surface 27 the spacing between letters will be diminished because the circular reference mark will intersect the sloping indicia lines 18, 19 on the stencil at a higher point. Another method of obtaining variations in spacing between letters is by removing the index member 36 from the guide member 25 and turning the index member so as to present a different edge for engagement with the guiding grooves 27, 28. Since the circular reference marks 38 on each side are spaced at varying distances from the edge 40 of the index member a different spacing will be obtained with each different circular reference mark, the amount being indicated to the operator by the numerals 42.

Another form of index member is shown in Figs. 7 and 8. In this modification the index member 50 is provided with movable reference indicia whereby the spacing between letters may be varied without having to change the position of the index member in the guide grooves. To this end, the member 50 comprises a base portion 52 adapted to fit within the guide grooves. The length of the base portion is less than the distance between the grooves so as to permit the base to engage the bottom of only one groove at a time in a manner heretofore described with reference to the index member 36. Mounted on the base 52 is a transparent member 54 adapted to overlie a cut-out portion or recess 56 therein, and rotatably mounted on the transparent member is a semi-circular member 58 carrying a transparent pointer 60. The clearance between the pointer 60 and the transparent member 54 is sufficient to allow the transparent member to lie under and the pointer to lie under the stencil 10. Rotation of the semi-circular member 58 and the pointer 60 is effected by means of an eccentric 62 rotatably secured to the transparent member and provides unlimited variation in letter spacing because it varies the point of intersection between the indicia on the pointer and the stencil. A further means of varying the letter spacing is provided by tapering one surface 64 on the base portion so that the index member 50 may be cocked diagonally between the guide grooves 27, 28. This permits the operator to vary the letter spacing without changing the setting of the pointer.

By using a circular reference indicia on the index member and straight line reference indicia on the stencil the applicants have provided composing apparatus capable of extreme accuracy even when used by inexperienced operators. The circle permits the operator to quickly and easily align the index member regardless of the slope of the reference indicia and aids in preventing errors because it doubles the apparent visual unsymmetrical appearance when registration is inaccurate.

The invention in its broader aspects is not limited to the specific mechanisms shown and described but departures may be made therefrom within the scope of the accompanying claims without departing from the principles of the invention and without sacrificing its chief advantages.

We claim:

1. Apparatus for photographically composing textual matter comprising, in combination, a guide member having guide surfaces thereon, a freely movable letter-bearing stencil in engagement with a guide surface on the guide member, reference indicia for each letter on the stencil to determine the spacing between letters in the text, a freely movable index member in engagement with a guide surface parallel to the guide surface on the guide member, and reference indicia on the index member adapted to selectively intersect the reference indicia on the stencil at a plurality of points to vary the amount of spacing between letters in the text one of said reference indicia on the stencil or the index member comprising sloping lines.

2. Apparatus for photographically composing textual matter comprising, in combination, a guide member having a plurality of guide surfaces thereon, a freely movable letter-bearing stencil in engagement with a guide surface on the guide member and having sloping reference indicia for spacing each letter in the text, and a freely movable index member having reference indicia to intersect the reference indicia on the stencil and determine the amount of spacing between letters, said index member being adapted to selectively engage more than one guide surface on the guide member to vary the point of intersection between the reference indicia on the index member and the stencil.

3. Apparatus for photographically composing textual matter as set forth in claim 2 in which the reference indicia on the stencil comprise a series of straight lines and the reference indicial on the index member comprises a small circle.

4. As per claim 3 in which the reference indicia on the stencil comprise a series of pairs of convergent lines, one pair for each letter.

5. Apparatus for photographically composing textual matter comprising, in combination, a guide member having guide surfaces thereon, a freely movable letter-bearing stencil in engagement with a guide surface on the guide member and having sloping reference indicia for spacing each letter in the text, a freely movable index member in engagement with a guide surface on the guide member, and reference indicia on the index member to intersect the reference indicia on the stencil, said index reference indicia being variably positionable with respect to the guide surface for the index member and the reference indicia on the stencil.

6. Apparatus for photographically composing textual matter as set forth in claim 5 in which the index member is adapted to selectively engage more than one guiding surface on the guide member to vary the point of intersection between the reference indicia on the index member and the stencil.

7. Apparatus for photographically composing textual matter comprising, in combination, a guide member having a plurality of parallel guide surfaces, a freely movable letter-bearing stencil in engagement with a guide surface on the guide member and having a transparent portion bearing reference indicia for spacing each letter in the text, a freely movable index member in engagement with a guide surface on the guide member and having reference indicia thereon to intersect the reference indicia on the stencil and determine the amount of spacing between letters, said reference bearing portion of the index member and transparent reference bearing portion of the stencil overlapping each other, one of said reference indicia comprising sloping lines and means for varying the point of intersection between the reference indicia on the index and the stencil.

8. Apparatus for photographically composing textual matter as set forth in claim 7 in which the guide member has a pair of parallel inwardly-opening grooves to receive the movable index member and an outwardly-opening groove to receive the stencil, said outwardly-opening groove being located between the inwardly-opening grooves and being separated therefrom by a transparent portion of the guide member.

9. Apparatus for photographically composing textual matter as set forth in claim 7 in which the guide member comprises a transparent member having its longitudinal edge portions folded inwardly to form inwardly-opening grooves to receive the index member, one of said folded edge portions being again folded back upon itself to form an outwardly-opening groove to receive the stencil.

10. Apparatus for photographically composing textual matter as set forth in claim 7 in which the index member is provided with a tapered surface to permit the index member to be diagonally positioned between the inwardly-opening grooves.

11. Apparatus for photographically composing textual matter as set forth in claim 8 in which the distance between the inwardly-opening grooves is greater than the width of the index member between the grooves so that only one groove is engaged by the index member at a time.

12. Apparatus for photographically composing textual matter comprising, in combination, a guide member having a plurality of guide surfaces, a freely moving letter-bearing stencil in engagement with a guide surface on the guide member and having sloping reference indicia for spacing the letters in the text, and a freely movable index member in engagement with a guide surface on the guide member and having reference indicia adjacent each side of the index member but variously spaced therefrom so as to intersect the reference indicia on the stencil at various points according to which side of the index member is in engagement with the guide surface on the guide member.

13. Apparatus for photographically composing textual matter as set forth in claim 12 in which the reference indicia on the index member comprises at least one circle and the reference indicia on the stencil comprises straight lines.

14. Apparatus for photographically composing textual matter comprising, in combination, a guide member having a plurality of guide surfaces, a freely moving letter-bearing stencil in engagement with a guide surface on the guide member and having sloping reference indicia for spacing the letters in the text, and a freely movable index member in engagement with a guide surface on the guide member and having movable reference indicia mounted thereon so as to vary the point of intersection between the reference indicia on the index member and the stencil and thereby vary the amount of spacing between letters.

15. Apparatus for photographically composing textual matter as set forth in claim 12 in which the reference indicia is rotatably mounted on the index member.

References Cited in the file of this patent

UNITED STATES PATENTS 2,537,069     Lohr                    Jan. 9, 1951